United States Patent [19]

Itoh et al.

[11] Patent Number: 5,008,802
[45] Date of Patent: Apr. 16, 1991

[54] DYNAMIC INPUT METHOD AND APPARATUS FOR PROGRAMMABLE CONTROLLER

[75] Inventors: Tatsuo Itoh; Hisayoshi Ito; Kiyomi Murasaki, all of Aichi, Japan

[73] Assignee: Mitsubishi Denki K. K., Tokyo, Japan

[21] Appl. No.: 295,323

[22] Filed: Jan. 10, 1989

[30] Foreign Application Priority Data

Jan. 11, 1988 [JP] Japan .................................. 63-3380

[51] Int. Cl.[5] .............................................. G05B 19/04
[52] U.S. Cl. .................................................... 364/140
[58] Field of Search ............... 364/140, 141, 147, 200, 364/143, 177

[56] References Cited

U.S. PATENT DOCUMENTS

| | | | |
|---|---|---|---|
| 4,028,666 | 6/1977 | Suzuki et al. | 364/200 |
| 4,115,861 | 9/1978 | Allington | 364/147 |
| 4,740,891 | 4/1988 | Kirkpatrick | 364/200 |

Primary Examiner—Jerry Smith
Assistant Examiner—Paul Gordon
Attorney, Agent, or Firm—Sughrue, Mion, Zinn, Macpeak & Seas

[57] ABSTRACT

A dynamic input system and apparatus for a programmable controller in which input data can be sequentially loaded without latching circuits. Accordingly, the apparatus is made simple in circuit construction, and low in manufacturing cost. The input apparatus is suitable for being formed on a printed circuit board.

2 Claims, 3 Drawing Sheets

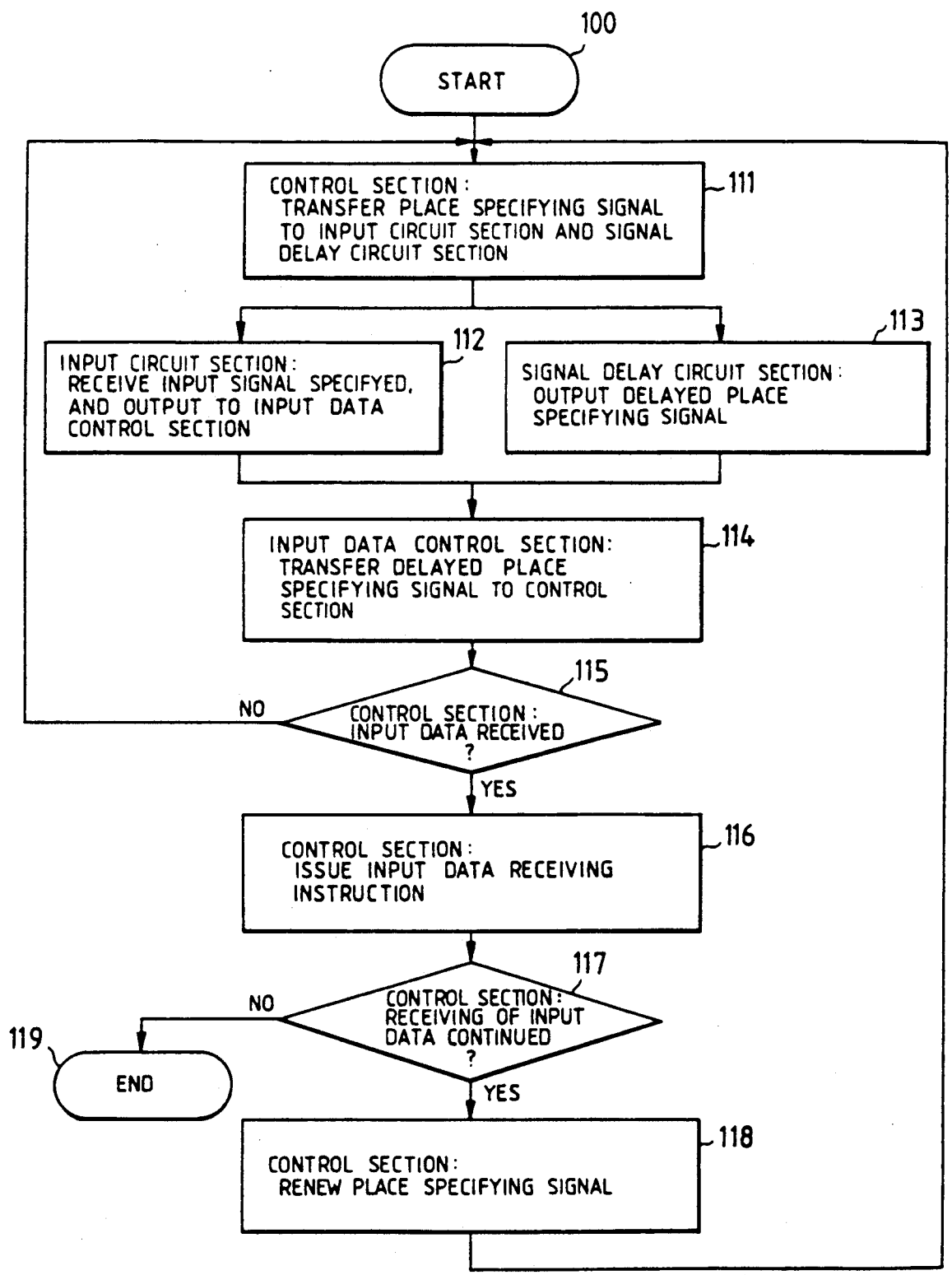

DYNAMIC INPUT METHOD AND APPARATUS FOR PROGRAMMABLE CONTROLLER

BACKGROUND OF THE INVENTION (1) Field of the Invention

This invention relates to an input method and apparatus for an input unit in a programmable controller, and more particularly to a dynamic input method and apparatus for a programmable controller.

(2) Description of Prior Art

A programmable controller extensively employed for the high-precision sequence control of variety of a devices, apparatuses or systems often operates according to the dynamic input method in which a number of input data applied thereto are divided into a plurality of parts, which are successively loaded with switching means.

FIG. 1 is a block diagram showing one example of an input unit and a control section in a programmable controller employing a conventional dynamic input method.

In FIG. 1, reference numeral 1 designates an input circuit section for receiving input signals, which has a number of input terminals (not shown). The input terminals are divided into groups (blocks) each including, for instance, eight (8) input terminals, so that the input circuit section 1 receives the input signals separately according to the groups specified by a group specifying signal applied separately thereto. Hereinafter, for simplification in description, the term "group (block)" will be referred to as "block", when applicable. The group specifying signal will be referred to as "a block painter signal".

Further in FIG. 1, reference numeral 2 designates an input data latch section comprising latch means 21 through 24, for temporarily holding input data; 3, an oscillator; 4, a frequency divider comprising for instance a counter for frequency-dividing the output pulse of the oscillator 3; 5, a decoder for converting the output of the frequency divider 4 into a block pointer signal; and 10, a control section for controlling the programmable controller in its entirety. The control section 10 comprises a CPU (central processing unit); memory for storing programs, and data (both not shown). The control section 10, being generally independent of the above-described input unit, is connected to the input data latch section 2 forming the input unit through a data transmitting, signal line A.

In operation of the circuit shown in FIG. 1, the output pulse signal of the oscillator 3 is applied to the frequency divider 4 where it is subjected to frequency division. The pulse signal thus frequency-divided; that is, the output of the frequency divider 4 is applied to the decoder where it is converted into a block pointer signal. The block pointer signal is applied to the input circuit section 1, so that the latter 1 receives the input data at the block thus specified and outputs it. At the same time, the block pointer signal is further applied to the latch means (21 for instance) in the input data latch section 2, which corresponds to the specification of block, so that the input data received by the input circuit section 1 is latched by the latch means 21. The decoder 5 outputs for instance, first, second, third and fourth block pointer signals repeatedly in the stated order. In response to the block pointer signals, the corresponding input data are successively received by the input circuit 1 and then latched by the corresponding latch means 21 through 24, so that the latest data are stored therein at all times. The control section 10 receives the input data from the input data latch section 2 when necessary.

The above-described input data latch section 2 is indispensable in the programmable controller operating according to the conventional dynamic input method, in which, in loading the input data from the input circuit 1 into the control section 10, they are temporarily latched in the input data latch section 2. Accordingly, it is disadvantageous in that the number of circuit elements constituting the latch section is relatively large resulting in having difficulties in suitably arranging those circuit elements on the printed circuit board and accordingly wiring them. Consequently, the programmable controller is expensive.

SUMMARY OF THE INVENTION

The object of this invention is to eliminate the above-described difficulties accompanying a conventional programmable controller. More specifically, the invention provides a dynamic input method for a programmable controller in which input data can be sequentially loaded without latching and a dynamic input apparatus for a programmable controller which is capable of performing the dynamic input method.

The dynamic input method for a programmable controller comprises: a step in which a control section applies a black pointer signal to an input circuit section and a signal delay circuit section; a step in which of input data applied from outside, the one at the block specified by the block pointer signal is received by the input circuit section; a step in which the block pointer signal applied to the signal delay circuit section is delayed for a period of time greater than the period corresponding to the delay of time from the time of application of the block pointer signal in the receiving of input data by the input circuit section, to form a delayed block pointer signal; a step in which the delayed block pointer signal is transferred to the control section; a step in which, upon reception of the delayed block pointer signal, the control section receives the input data which has been specified by the block pointer signal and received by the input circuit section; and a step in which the control section renews the specification of block, to output another block pointer signal.

BRIEF DESCRIPTION OF THE DRAWINGS

In the accompanying drawings,

FIG. 3 is a flow chart for a description of the circuit shown in FIG. 1; and

DESCRIPTION OF PREFERRED EMBODIMENT

Figure 4:
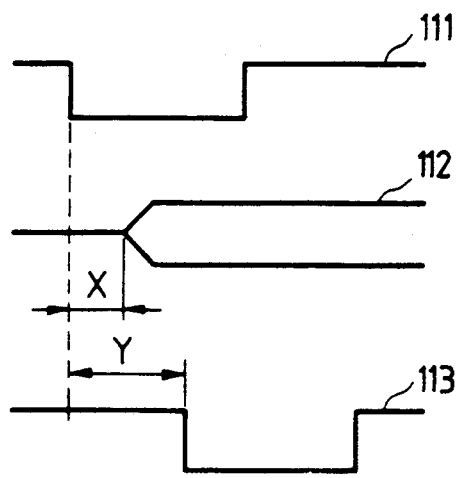
FIG. 4 is an explanatory diagram showing the relation between a delay time in the receiving of input data by an input circuit section and the time of outputting a delayed block pointer signal.

One preferred embodiment of this invention will be described with reference to FIGS. 2, 3 and 4.

Figure 1:
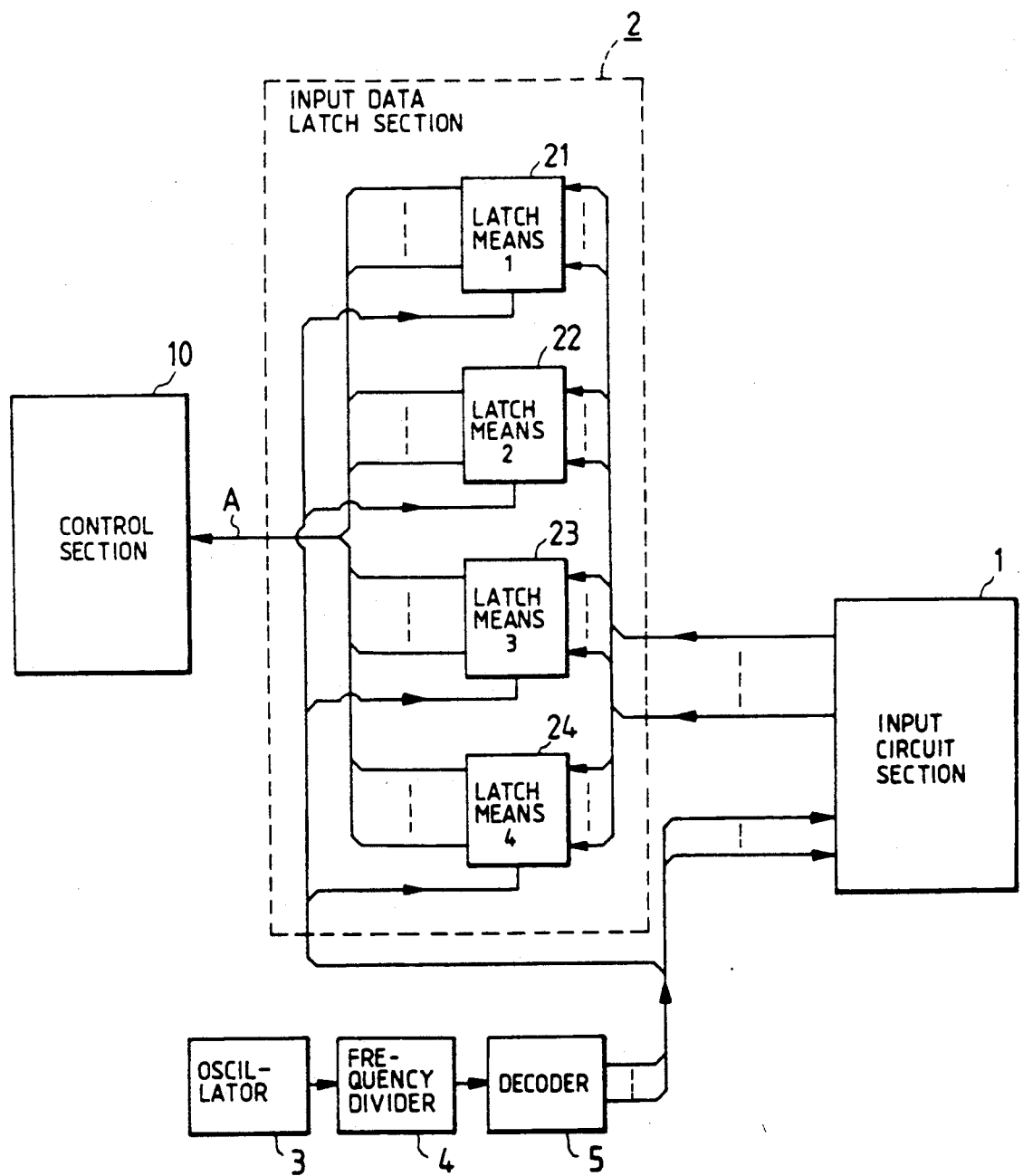
FIG. 1 is a block diagram showing an input unit and a control section in a programmable controller operating according to a conventional dynamic input method.

In these figures, parts corresponding functionally to those which have been described with reference to FIG. 1 are designated by the same reference numerals or characters.

Figure 2:
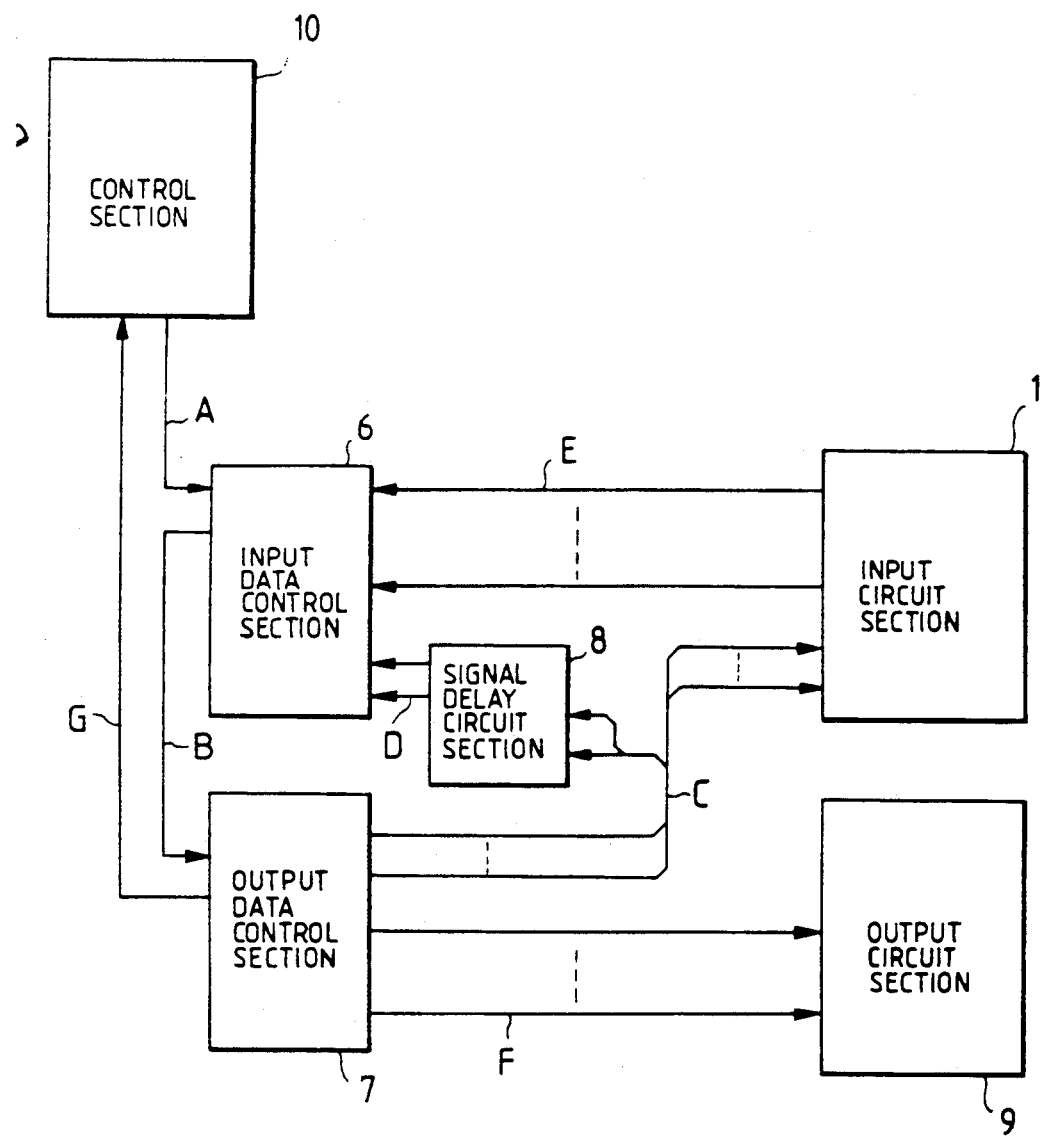
FIG. 2 is a block diagram showing an input unit and a control section in a programmable controller operating according to a dynamic input method which is one embodiment of this invention.

FIG. 2 is a block diagram showing an input-output unit and a control section in a programmable controller employing a dynamic input method according to the invention.

In FIG. 2, reference numeral 6 designates an input data control section for controlling the inputting of data from the input circuit section and communication with the control section 10; 7, an output data control section for controlling the outputting of data from an output circuit section 9 (described later) and communication with a control section 10; 8, a signal delay circuit section; and 9, the output circuit section for outputting data to external circuits. The signal delay circuit section 8 delays a block pointer signal inputted more than the time of delay which, in loading the input data from the input circuit section 1, is caused by a signal isolating circuit or a CR circuit forming the input circuit section 1; that is, more than the time interval which elapses from the time instant that the block pointer signal is inputted until the input data at the place specified thereby is loaded to thereby output a delayed block pointer signal. The control section 10 functions similarly as in the control section in the above-described conventional programmable controller, and has functions of outputting the above-described place specifying signal as data and comparing the specification of place of the block pointer signal with the specification of place of the delayed block pointer signal inputted to thereby determine whether or not the input data at the specified block of the input circuit section 1 has been loaded. The above-described input-output unit comprises the blocks 1, 6, 7, 8 and 9. The input data control section 6 and the output data control section 7 in the input-output unit are connected to the control section 10 through signal lines A and G through which data are transmitted in a serial mode.

The operation of the circuit shown in FIG. 1 will be described with reference to FIG. 2 showing a flow chart thereof.

When input data from external devices, apparatuses or systems are loaded in the control section 10 through the input circuit section 1, the control section 10 outputs a block pointer signal as data. The block pointer signal thus outputted is applied to the input circuit section 1 and the signal delay circuit section 8 through the signal line A, the input data control section 6, the signal line B, the output data control section 7, and a signal line C provided for transferring data in a parallel mode (Step 111). The input circuit section 1 receives only the input data at the block specified by the block pointer signal. The input data thus received is applied through a signal line (data bus) E to the input data control section 6 (Step 122). On the other hand, in response to the above-described block pointer signal, the signal delay circuit section 8 outputs the delayed block pointer signal the phase of which lags behind that of the block pointer signal more than a period of time corresponding to the delay of time involved when the input circuit section 1 has received the input data (Step 113). The delayed block pointer signal thus outputted is applied to the control section 10 through a signal line D,k the input data control section 6, the signal line B, the output data control section 7 and a signal line G (Step 114).

In the control section 10, the delayed block pointer signal is compared with the block pointer signal outputted previously. When the blocks of the two signals are equal to each other, the control section 10 determines that the input circuit section 1 has received the input data at the block specified by the place pointer signal, and the input data are ready to transfer from the input data control section 6 (Step 115). As a result, the control section 10 issues an input data receiving instruction, so that the input data is transferred from the input data control section through the signal line B, the output data control section 7, and the signal line G to the control section 10 (Step 116). FIG. 3 is to explain why, in Step 115, upon reception of the delayed block pointer signal, the control section 10 can determine that the input circuit section 1 has received the input data. That is, FIG. 3 shows the delay time X which elapses from the time instant that the block pointer signal is applied to the input circuit section 1 and the signal delay circuit section 8 (Step 111) until the input circuit section 1 receives the input data at the specified block (Step 112), and the delay time Y until the signal delay circuit section outputs the delayed block pointer signal (Step 113). In order to compensate the delay of time in the receiving of the input data by the input circuit section 1 which attributes, for instance, to the circuit elements forming the input circuit section 1, all that is necessary for the delay time Y is that it is longer than the delay time X. However, in practice, the delay time Y is determined much longer than the delay time X in view of the fluctuation in characteristic and the variation with time of the circuit elements forming the input circuit section 1 and the signal delay circuit section 8.

Next, the control section 10 determines whether or not the receiving of input data should be continued (Step 117). However, since the input data are, in general, received successively in an endless mode, the block pointer signal is switched over to another one for the next place (Step 118), and the first Step 111 is effected again. This flow of operations is carried out repeatedly so that the necessary input data are loaded in the control section. When, in Step 115, the delayed block pointer signal which coincides in block specification with the block pointer signal outputted previously, the step 111 is effected again, so that the control section 10 outputs the block pointer signal.

In the above-described embodiment, the data are applied to or received from the control section in the programmable controller in a serial mode through the input data control section 6 and the output data control section 7. The programmable controller may be so modified that the input data control section 6 and the output control section 7 are formed into one unit, namely, an input-output control section, and that the transfer of data is carried out in a parallel mode instead of the serial mode.

As was described above, according to the present invention, the control section applies the block pointer signal, as data, to the input circuit section and the signal delay circuit section, and upon reception of the block pointer signal the input circuit section receives the input data at the block specified by the signal, while the signal delay circuit outputs the delayed block pointer signal the phase of which lags behind that of the block pointer signal more than the time required for the input circuit section to receive the input data. The delayed block pointer signal is applied to the control section, where it is compared with the block pointer signal provided previously. When the delayed block pointer signal is equal in the specification of block to the block pointer signal, the control section determines that the input data at the block specified by the block pointer signal has been received by the input circuit section, and receives the input data. Then, the control section specifies another block; that is, it outputs another block pointer signal. Owing to the employment of this dynamic input method, the programmable controller is simple in arrangement and low in manufacturing cost, and can be readily mounted on the printed circuit board.

What is claimed is:

1. A dynamic input method for a programmable controller comprising the steps of:

applying a block pointer signal generated by a control section to an input circuit section and a signal delay circuit section;

loading input data into said input circuit section at the block specified by said block pointer signal;

delaying said block pointer signal applied to said signal delay circuit section for a period of time greater than the period corresponding to a delay of time from said application of said block pointer signal to said input circuit section to the output of said block pointer signal from said signal delay circuit section, to form a delayed block pointer signal;

transferring said delayed block pointer signal to said control section;

loading into said control section said input data which has been loaded to said input circuit section and specified by said block pointer signal when said delayed block pointer signal is applied to said control section; and renewing said block pointer signal, by outputting another block pointer signal which points to a different block.

2. A dynamic input apparatus for a programmable controller comprising:

an input data control means for controlling the inputting of data from an input circuit means and communication with a control means; an output data control means for controlling the outputting of data from an output circuit means to external circuits and communication with said control means; and a signal delay circuit means, said signal delay circuit means delaying a block pointer signal inputted from said control means through said input and output circuit means for a time interval greater than the interval from the time instant that said block pointer signal is inputted until the input data at the block specified by said block pointer signal thereby is loaded to thereby output a delayed block pointer signal.

* * * * *